3,020,676
METHOD OF FERTILIZING AND CONTROLLING SOIL MOISTURE WITH PHOSPHATE SLIME
Harold J. McGillivray, 512 N. Delaware Ave., Tampa, Fla.
No Drawing. Filed Oct. 27, 1958, Ser. No. 769,535
1 Claim. (Cl. 47—58)

This invention relates to a method of and means of controlling the undue discharge of moisture from the root zones of soil and to the enrichment of soil and the feeding of plant nutrient by the material selected for such moisture control. More particularly, the preferred form of the invention relates to the formation of moisture flow barriers precluding the excessive loss of moisture from the root zones of soil, and specifically to the use of phosphate slime for this purpose by which the nutrient values of the phosphate is available to the roots of lawns, shrubbery, trees and crops.

In many regions the soil is of such natural porosity to a depth well below the normal root zones of plant life that irrigation water, whether natural as by rain, or artificial as by spray or irrigation ditch, rapidly percolates from the root zone leaving the zone arid despite a copious moisture supply. In such soils the moisture flow may be downwardly and/or laterally at such rate as to require excessive supply in order to maintain sufficient moisture in the root zone to satisfactorily maintain plant life. The prior art has disclosed numerous means and methods of soil treatment to provide sub-soil barriers of relatively moisture impervious character. Some of such prior art illustrates the incorporation with moisture flow restraining materials, additives having nutrient value. However, in some instances the material suggested may be deleterious to plant life and the barrier may be so rigid as to militate against natural earth movement and breathing.

The primary object of the present invention is to provide an agricultural moisture control material which contains substantial nutrient value so that the soil may be enriched by the inclusion therein of material inhibiting the undue flow of moisture from the root zones of the soil. More particularly, the invention has as an object, to provide a single substance, preferably a material found in nature, which of itself without addition, subtraction, or modification, fulfills desideratum of moisture flow control and nutrient supply. More specifically, the present invention comprehends the use of phosphate slime as a natural material having unexcelled nutrient value while providing a yieldable, substantially impervious, moisture flow barrier. Other objects, features and advantages of the present invention will be apparent from a consideration of the following specification.

Phosphate slimes as found with rock phosphate deposits, are an objectionable by-product of rock phosphate mining and quarrying and no utility has heretofore been found for it. Thus, the material is not only abundant, but it is inexpensive, being freely available where phosphate deposits are mined and quarried for the rock phosphate so abundantly used alone or with other ingredients as a fertilizer.

This material is commonly found to be 20% solid, and of such fineness that approximately 75% will pass through a 325 mesh screen. In the collection pools or ponds at a quarry operation the slimes may be so diluted as to contain but 3 to 5% solids, and are hence readily pumpable for collection, transportation, and use in the method of this invention. Analysis has indicated approximately 29.5% of biphosphate of lime and 41.3% of the material is acid insoluble.

Phosphate slimes or sludges have been found to have such tenacity for their affinity with water as to have resisted processes for their conversion into more anhydrous products. This characteristic, therefore, lends itself admirably to the retention of a moisture content in the soil and the formation of a moisture barrier. Since this material is fully hydrolyzed, resisting the absorption of additional moisture and being of such density, coherence and viscosity as to preclude passage of water therethrough it will, in layer formation, provide an effective moisture barrier.

The present invention embraces the use of the phosphate slime as an additive to the soil by the co-mingling thereof with the soil particles in the root zone of trees, plants, shrubbery, lawns and agricultural crops. Such application of phosphate slime will provide, as an admixture to the soil, a moisture containing and retaining nutrient material. Such application of slime material may be achieved through a surface deposit of the material followed by such cultivation operations as plowing, harrowing, disking or the like by which the material will be intermingled with the soil below the surface thereof. It is also contemplated that such impregnation of the soil with such material may be accomplished by the forced injection of such material below the surface with or without co-operative agricultural procedures. Thus the substance will be deposited in the root zone of the soil intermingled with soil particles.

The present invention is, however, more particularly concerned with the formation of a moisture barrier layer blocking the percolation therethrough of irrigation waters. It is recognized that in some terrains the loss of irrigating moisture through the interstices of the soil may be lateral as distinct from vertical and in such instances it is understood that the invention contemplates that the barriers may be erected with a vertical component, in order to preclude what may be defined as a sub-surface runoff of the irrigation waters. With generally flat surfaces the invention provides for the formation of a horizontal moisture barrier below the root zone of such vegetation as may be cultured in and above such zones. In one specific practice of the invention the phosphate slime may be forced into the soil below the lower areas of the root zone of the soil to be treated. Such injection of the phosphate slimes may be accomplished by many methods of the prior art. As a specific illustration, the slimes may be deposited through hollow ground penetrating elements of the type disclosed in the W. A. Green patent, No. 2,822,769, dated February 11, 1958, or in the nature of that disclosed in the apparatus of the W. R. Hanna patent, No. 2,072,331 or A. P. Ruth patent, No. 2,806,324.

While the present invention does not embrace any specific structural mechanism for the deposition of a phosphate slime layer below the root zone of the soil, it does comprehend such equipment as may inject contacting and intercommunicating areas of such slime in a uniform plane to form a consolidated moisture barrier. Such barrier need not necessarily be horizontal where the problem of moisture retention may be that of a lateral seepage as on slopes where contour cultivation is practiced. In such instances a barrier of the present invention may well be formed vertically or with a vertical component. Moreover, in certain specific situations as with lawns, both vertical as well as interconnecting horizontal barriers may be desirable.

The essence of the present invention resides in the provision of a moisture containing and sustaining material formed of plant nutrient material. More particularly the invention resides on the use of phosphate slimes for this purpose. The invention further resides in the formation of a moisture barrier of such material. Preferably such barrier is so positioned in relation to the root zone of plant life that the root zone soil will be fed by and/or the root structures may penetrate the barrier to absorb and benefit by the nutrient qualities thereof. It is, of course, understood that many variations of the types of materials suggested and the means of incorporating such material into the soil may be resorted to without departure from the spirit or scope of the invention as outlined in the appendant claim.

What I claim is:

The method of simultaneously enhancing the fertility and moisture retaining qualities of an agricultural area which includes the step of depositing a subsurface layer of phosphate slime by the individual injection of adjacent deposits thereof to form contiguous horizontal subsurface areas of such slime.

References Cited in the file of this patent

UNITED STATES PATENTS

| | | |
|---|---|---|
| 1,171,558 | Taylor | Feb. 15, 1916 |
| 1,608,917 | Widdis | Nov. 30, 1926 |
| 1,776,016 | Alvord | Sept. 16, 1930 |
| 2,351,256 | Fischer | June 13, 1944 |

FOREIGN PATENTS

| | | |
|---|---|---|
| 253,643 | Germany | Nov. 14, 1912 |

OTHER REFERENCES

"Report on Possible Utilization of Phosphate Rock Slimes" (Tyler and Waggaman), published June 29, 1953, by National Academy of Sciences, National Research Council, Washington, D.C., 132 pages in all. Page 51 relied on.

Tyler: "Phosphatic Slime," published May 1954, in Industrial and Engineering Chemistry (magazine), volume 46, No. 5, pages 1049 through 1056.